United States Patent
Carullo et al.

(10) Patent No.: US 9,298,821 B2
(45) Date of Patent: Mar. 29, 2016

(54) DETERMINING MISSING MEDIA CONTROL INFORMATION BASED ON PREVIOUS MEDIA TRANSMISSIONS

(71) Applicant: International Business Machines Corporation, Armonk, NY (US)

(72) Inventors: Vittorio Carullo, Rome (IT); Antonio Castellucci, Rome (IT); Roberto Guarda, Pomezia (IT); Alessandro A. Rea, Naples (IT)

(73) Assignee: International Business Machines Corporation, Armonk, NY (US)

( * ) Notice: Subject to any disclaimer, the term of this patent is extended or adjusted under 35 U.S.C. 154(b) by 173 days.

(21) Appl. No.: 14/144,698

(22) Filed: Dec. 31, 2013

(65) Prior Publication Data

US 2015/0186512 A1    Jul. 2, 2015

(51) Int. Cl.
| | |
|---|---|
| G06F 17/30 | (2006.01) |
| H04N 21/45 | (2011.01) |
| H04N 21/454 | (2011.01) |
| H04N 21/462 | (2011.01) |
| H04N 21/84 | (2011.01) |

(52) U.S. Cl.
CPC ........ *G06F 17/30817* (2013.01); *H04N 21/454* (2013.01); *H04N 21/4532* (2013.01); *H04N 21/4622* (2013.01); *H04N 21/84* (2013.01)

(58) Field of Classification Search
CPC ................. G06F 17/30017; G06F 17/30817
USPC ......................................................... 707/758
See application file for complete search history.

(56) References Cited

U.S. PATENT DOCUMENTS

| | | | |
|---|---|---|---|
| 8,296,808 B2 | 10/2012 | Hardacker et al. | |
| 8,402,483 B2 | 3/2013 | Okamoto et al. | |
| 2003/0188307 A1 | 10/2003 | Mizuno | |
| 2008/0091713 A1* | 4/2008 | Candelore et al. | 707/103 R |
| 2008/0177730 A1* | 7/2008 | Endo et al. | 707/5 |
| 2008/0199150 A1* | 8/2008 | Candelore | 386/95 |
| 2010/0293579 A1* | 11/2010 | Kulick et al. | 725/49 |
| 2011/0055866 A1 | 3/2011 | Piepenbrink et al. | |
| 2011/0225606 A1* | 9/2011 | Williams et al. | 725/28 |
| 2012/0060181 A1* | 3/2012 | Craner | 725/28 |

OTHER PUBLICATIONS

U.S. Appl. No. 14/476,931 entitled "Determining Missing Media Control Information Based on Previous Media Transmissions", filed Sep. 4, 2014.

* cited by examiner

*Primary Examiner* — Mahesh Dwivedi
(74) *Attorney, Agent, or Firm* — Daniel R. Simek

(57) ABSTRACT

A processor receives a media rating associated with a first media program and metadata associated with the first media program. The processor stores the metadata and the media rating associated with the first media program in a local database. The processor receives a second media program absent a media rating. The processor determines metadata associated with the second media program absent the media rating. The processor searches the local database based on the metadata associated with the second media program absent the parental control rating. The processor matches the metadata associated with the second media program absent the media rating to the metadata of the first media program including the media rating, and the processor applies the media rating of the first media program to the second media program.

10 Claims, 4 Drawing Sheets

DETERMINING MISSING MEDIA CONTROL INFORMATION BASED ON PREVIOUS MEDIA TRANSMISSIONS

BACKGROUND OF THE INVENTION

The present invention relates generally to the field of viewing guide information of transmission programming, and more particularly to determining control ratings of media programming transmitted without control ratings.

Transmission of television programming may include information about the type of program, the duration of the program transmission, an overview of the content, as well as other information. Information that may be particularly useful is the parental control rating associated with the transmitted media program. Parental control information uses a rating system to indicate to parents how appropriate a program's content may be for a viewing audience.

TV parental control guidelines for the US, Canada and Brazil include TV-Y, designated as appropriate for all children; TV-Y7, designated for children age 7 and above; TV-G, designated as most parents would find the program suitable for all ages; TV-PG, for programs containing material that parents may find unsuitable for younger children; TV-14, for programs that contain some material that parental guardians may find unsuitable for children under the age of 14; TV-MA, for programs specifically designed to be viewed by adults and may be unsuitable for children under the age of 17. In addition, some cases of parental guidance include sub-ratings that use alphabetic letters to designate the unsuitable area contained in the program. For example, "D" may used to indicate suggestive dialog, "L" designates coarse language, and "V" may be used to indicate the program contains violence.

The transmission signal includes a special code which indicates the program's rating for the content of the transmission. The programs' rating information is encoded on line 21 of the transmission signal's vertical blanking interval (VBI) using the extended data service (XDS) protocol. XDS is an Electronic Industries Alliance standard (CEA-608-E) used by TV stations, networks and program syndication distributors for the delivery of data associated with the transmission program, among other purposes. If the program rating is outside the level configured as acceptable on a particular television set, the program is blocked.

Most televisions manufactured after 1996 include technology enabling the control of program viewing based on selection of parental ratings. Using this technology, parents can adjust their television sets so that programs with content unsuitable for the selected parental control rating are blocked and cannot be viewed unless the parental control is changed or disabled. Precautions taken to insure only appropriate programs are viewable can be ineffective if programs are transmission without the associated parental control rating, especially in the case of program re-transmissions, which may omit parental control ratings.

BRIEF SUMMARY

Embodiments of the present invention include a method, computer program product and computer system for determining a media rating of a transmitted media program. A processor receives a media rating associated with a first media program and metadata associated with the first media program. The processor stores the metadata and the media rating associated with the first media program in a local database. The processor receives a second media program absent a media rating. The processor determines metadata associated with the second media program absent the media rating. The processor searches the local database based on the metadata associated with the second media program absent the parental control rating. The processor matches the metadata associated with the second media program absent the media rating to the metadata of the first media program including the media rating, and the processor applies the media rating of the first media program including the media rating to the second media program, absent the media rating.

DETAILED DESCRIPTION

Figure 1:
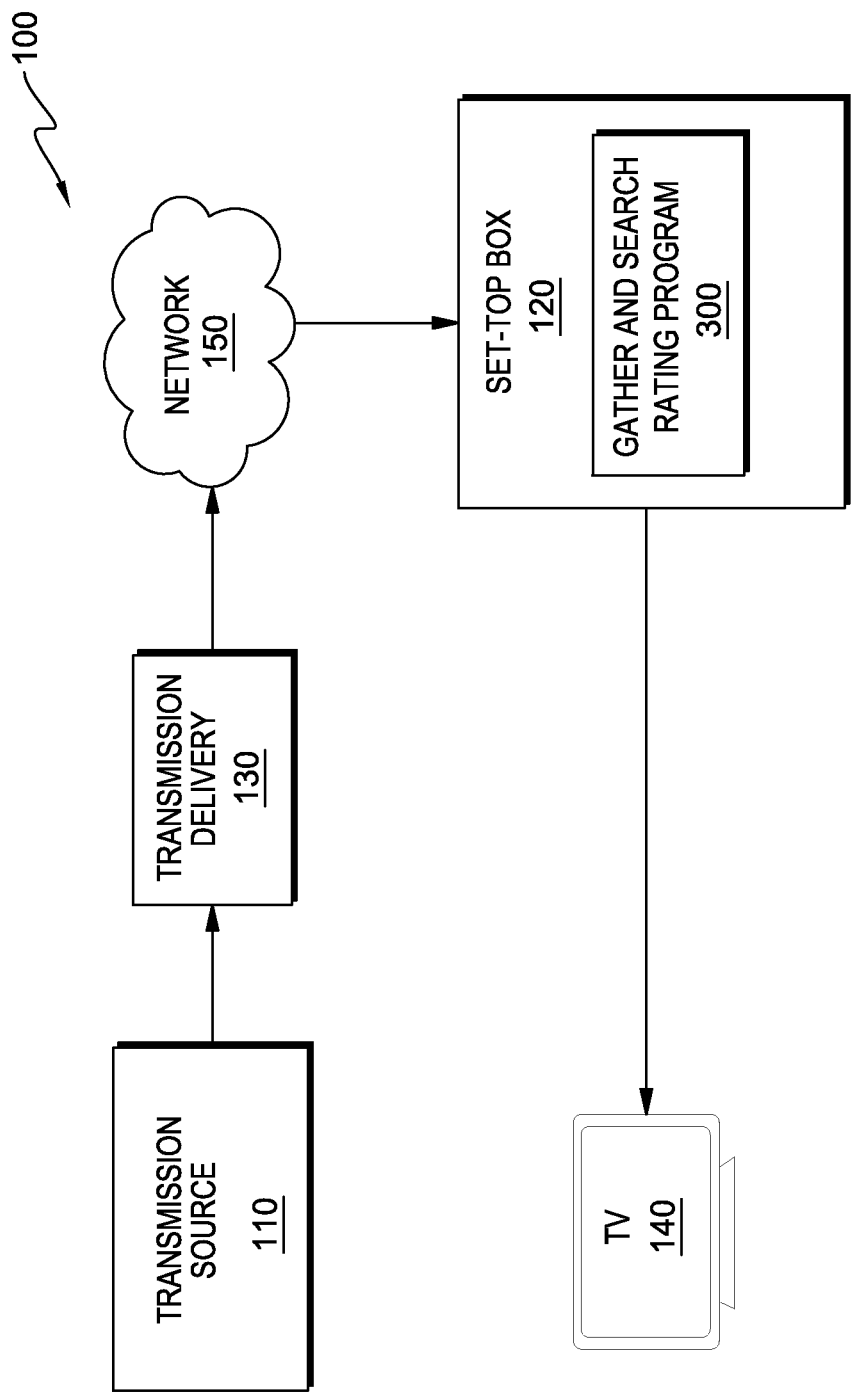
FIG. 1 is a functional block diagram illustrating a communication transmission environment, generally designated 100, in accordance with one embodiment of the present invention.

Embodiments of the present invention recognize that not all transmissions of media programs, such as television (TV) media programs, include parental control ratings. If parental control ratings are absent for a TV media program, embodiments of the present invention search the electronic program guide (EPG) information or metadata that may be present in transmissions. EPGs are continuously updated menus displaying media programming or scheduling information for current and upcoming programs. If the EPG includes metadata associated with the transmission media program missing parental control ratings, embodiments of the present invention retrieve elements of the metadata that can be used as key terms for searching a local database on which is stored metadata associated with previously viewed media programs that include a parental control rating. If a search using the key terms results in a match, the parental control rating of the matched, previously viewed media program is applied to the parental control ratings of the current transmission media program and used to determine if the current media program is to be blocked from being displayed on the TV.

In the case in which neither the transmission program nor the EPG include parental control rating information for the program, embodiments of the present invention use modified optical character recognition (OCR) techniques to obtain key terms associated with the current media program. Embodiments of the present invention apply OCR to the frames of the initial portion of the current media program converting text images to text data, associating the current media program with the text-based metadata obtained by OCR that may include a title, a subtitle, a description, an episode, a soundtrack title, names, roles, credits, a duration, a date, and other sources within or associated with, the streaming content of the current media program. Elements of the metadata are used as key terms to search the local database for a match with the metadata of the previously viewed media program that includes a parental control rating. The parental control rating of the previously viewed media program is applied to the current media program to determine if the program is to be displayed or blocked.

A database containing a collection of media program information gathered while previously viewing the media program, and including parental control ratings, is searched using the key terms from the metadata of the current media program. If a match for the current media program is found, the parental control rating from the previously viewed media program information is applied to the current transmission to determine if the program is to be blocked from viewing.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating a communication transmission environment, generally designated 100, in accordance with one embodiment of the present invention. FIG. 1 includes transmission source 110, set-top box 120, which is depicted as including gather and search rating program 300, transmission antenna 130, television (TV) 140 and network 150.

Transmission source 110 is the originating source of the media program to be transmitted. Transmission source 110 can be a TV network, a TV station, a syndicated broadcaster of TV programming or a re-broadcaster of TV programming or any TV programming source sending the signal of a transmitted program to a delivery entity such as transmission delivery 130.

Transmission delivery 130 receives the transmitted program from transmission source 110 and in turn, formats and transmits the media program to network 150. Transmission delivery 130 is associated with multiple delivery formats, for example, delivery through coax cable, delivery by use of satellites, and delivery through a web connection using the Internet. Transmission delivery 130 formats the transmitted program appropriately for the method of delivery.

Network 150 receives the transmitted delivery of the program and connects to recipient devices, such as set-top box 120. Network 150 can be for example, a local area network (LAN), a wide area network (WAN) such as the Internet, or a combination of the two, and can include wired or wireless connections. Network 150 can also include a satellite-based connection, or a coax cable-based connection. In general, network 150 can be any combination of connections and protocols that will support communications via various channels between transmission delivery 130 and set-top box 120, in accordance with an embodiment of the present invention.

TV 140 is a television set that receives a transmission signal from set-top box 120 and displays the processed video signal and produces sound from the processed audio signal.

Set-top box 120 is a device that receives transmission source signals, such as a digital television signal, and processes the signals into the audio sounds and video displays of a television set. Set-top box 120 generally contains a TV-tuner to receive an external signal source as an input and turns the source signal into content in a form that can then be displayed on the television screen or other display device. Set-top box 120 is typically used in association with cable television, satellite television, and over-the-air television transmissions. Set-top box 120 receives an input signal and based on a TV channel selection, processes the transmission signal component associated with the selected channel, and formats the signal for display and sound presentation. In some cases the transmission signal is received in an encrypted format, in which case set-top box decrypts the signal for processing.

Set-top box 120 includes gather and search rating program 300, which is a program that has access to the received and decrypted transmission signal, and uses optical character recognition (OCR) techniques to identify text included within the signal stream of a transmitted program. Gather and search rating program 300 scans the text content of the first few minutes, for example, the first 1 to 3 minutes, of a transmitted TV program, and stores key text terms associated with the TV program in a local database. The key text terms associate the parental control rating information with the TV program, if included in the streaming signal. When a current TV program is received that does not include parental control ratings, gather and search rating program 300 uses key terms from the current TV program to search the stored data in the database. If a match is determined, the parental control rating from the stored match is retrieved and applied to the current TV program.

TV transmission signals are displayed as a sequence of rows on a TV screen. Each row is made up of pixels which receive signals to display certain colors. The rows of pixels are refreshed multiple times per second for each frame of video content displayed on the TV. Each frame includes a vertical blanking interval (VBI), which is the time difference between the last line of one frame and the beginning of the first line of the next frame. It is present in analog and digital television, and other signals. During the VBI the incoming data stream is not displayed on the screen. The signal source, such as a TV transmission signal, does not supply image information during the VBI. Although modern TVs no longer require such a long blanking interval, or in most cases, require none, the standards were established when the delay was needed. Since nothing is sent from the transmission signal during the VBI, and the VBI isn't displayed on the screen, codes, text and other data encoded by the XDS protocol (e.g., time codes, closed-captioning, and parental control ratings), and other digital data can be sent during this time period.

Although embodiments of the present invention are described herein using parental control ratings of television media program transmissions, embodiments of the present invention are not limited to determining parental control ratings of television program transmissions. Embodiments may include other media program transmissions having media ratings represented by text, icons, or other images recognizable by OCR, for example, an icon indicating a high level of violent content for a computer video game transmitted over the Internet. For simplification purposes, embodiments of the present invention hereafter will be described with reference to a parental control rating for media ratings, and refer to television media program transmissions for media program transmissions.

Figure 2:
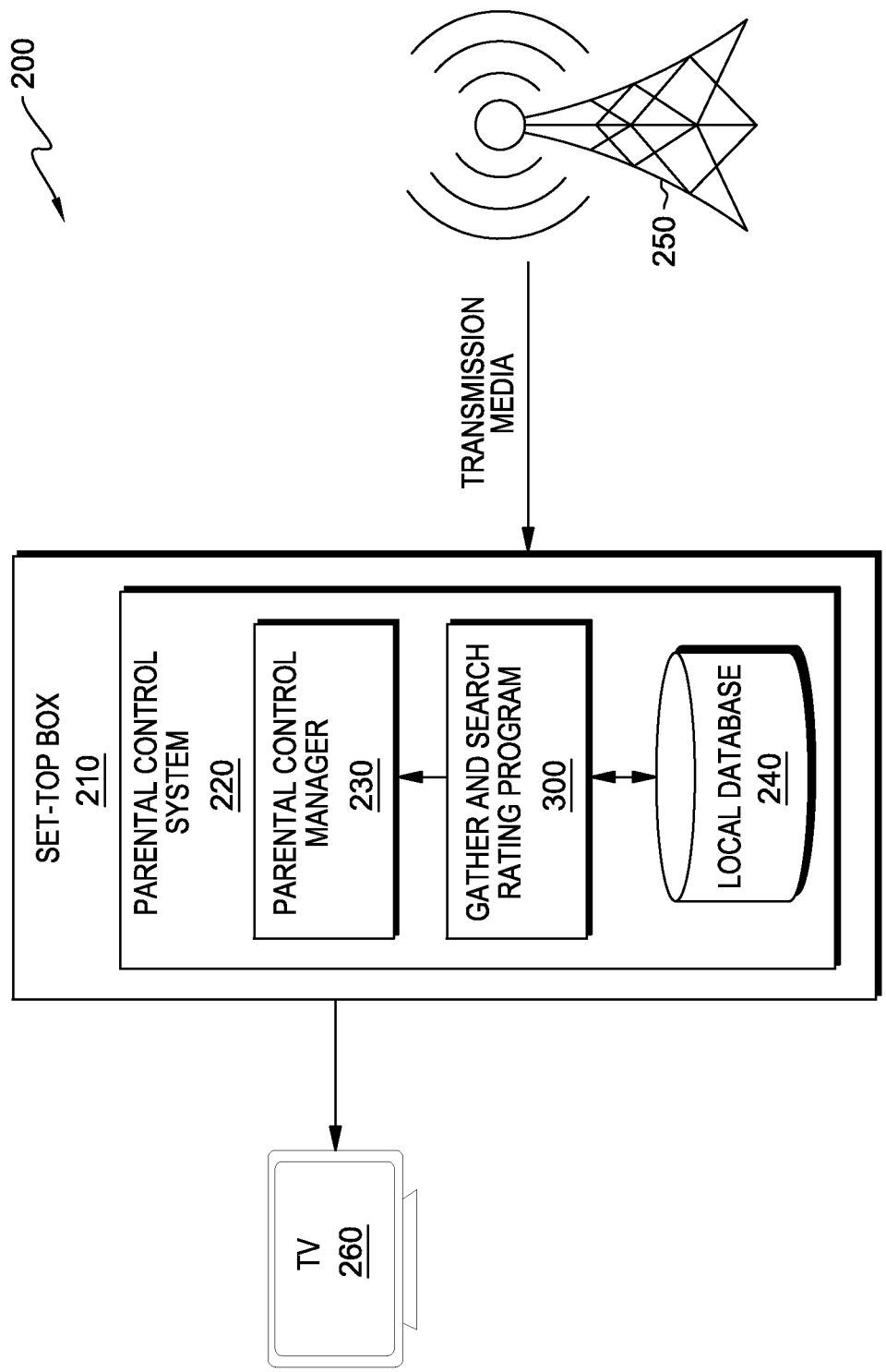
FIG. 2 is a functional block diagram depicting components included in a set-top box receiving a signal of transmission media and sending the signal to a television set, in accordance with an embodiment of the present invention.

FIG. 2 is a functional block diagram depicting components included in a set-top box receiving a transmission signal of media and sending the signal to a television set, in accordance with an embodiment of the present invention. FIG. 2 includes TV 260, which is a television set receiving a transmission media signal from set-top box 210. Additionally, FIG. 2 includes transmission media 250, and set-top box 210, which includes parental control system 220. Parental control system 220 includes local database 240, parental control manager 230, and gather and search rating program 300.

Transmission media 250 is a media signal from a transmission source received by set-top box 210. Transmission media 250 may be transmitted via satellite, coax cable, the Internet, a local network connection, or other network delivery path. Transmission media 250 may also include electronic programming guide (EPG) information, which contains program description, planned program scheduling, and may contain parental control rating information.

Set-top box 210 is a device connected to a TV and includes a TV-tuner for selecting a specific channel from a multi-channel signal, and outputs the media of the selected channel to display on the TV. Set-top box 210 is typically used with input signals from coax cable television, satellite television, and signals received using over-the-air television transmission. Set-top box 210 receives a media signal from transmission media 250 and performs processing on the signal enabling display of the media on TV 260. Set-top box 210 includes parental control system 220, which further includes parental control manager 230, gather and search rating program 300 and local database 240.

Parental control system 220 includes hardware and software components to determine the parental control rating of a TV program from transmission media 250, and apply a user-set rating limit to determine if a TV program is displayed or blocked. Parental control system 220 includes components capable of executing computer-readable programming instructions as discussed in detail relative to FIG. 4. Parental control system 220 obtains the parental control rating of a TV program from the transmission media stream and compares the program rating to the rating limit preference setting stored in local database 240. If the rating of the TV program is outside the rating limit stored in preference settings, the TV program is blocked, and otherwise displayed.

Parental control manager 230 acts as a managing device of transmission media allowed to be displayed on TV 260. Parental control manager 230 compares the parental control rating of the TV program on the selected channel of set-top box 210 TV-tuner to the user-set parental control rating limit stored in local database 240. Parental control manager 230 blocks TV program media having parental control ratings that exceed or are outside of the user-set parental control rating limit. In embodiments of the present invention, the parental control rating limit may be a factory-set default limit.

For example, user preference settings of set-top box 210 include a parental control rating limit of "TV-PG", which indicates that media having this rating may contain material that parents may find unsuitable for younger children. Transmission media 250 is received by set-top box 210 and a TV program channel is selected by the setting of the TV-tuner within the set-top box 210. The TV media program of the selected channel is determined by parental control system 220 to include a parental control rating of "TV-14". Parental control manager 230 compares the TV-14 rating of the TV media program to the rating limit setting of TV-PG and determines that the TV media program exceeds a threshold rating or is outside of a rating limit setting, and blocks the TV media program from display on TV 260.

If the parental control rating is not included within the transmitted TV media program, for example, the rating is not included in line 21 of the vertical blanking interval (VBI), the EPG component of transmission media 250 is searched by gather and search rating program 300, to determine if a parental control rating is available within the EPG content. If the parental control rating is found within the EPG content, the rating is passed on to parental control manager 230 and compared to the rating limit setting.

Gather and search rating program 300 is a software program capable of gathering text-based information contained within the video component of each transmission media program received and selected by a TV-tuner of set-top box 210. Gather and search rating program 300 includes OCR techniques, enabling discovery of text images within the video component of a media stream, and conversion of the text images to searchable data. Gather and search rating program 300 includes the capability to gather descriptive and characteristic text data associated with TV media programs and store the data in local database 240.

When a current TV media program, which is a re-transmission of the TV media program, does not include a parental control rating and the EPG component similarly does not include a parental control rating, gather and search rating program 300 searches for a rating from data gathered and stored from a previous transmission of the same TV media program. Gather and search rating program 300 is enabled to search local database 240 using metadata that serves as identifying elements or "key terms", obtained by the use of OCR techniques applied to the currently viewed TV media program. The key terms are used to match the current TV media program to data stored from previously transmitted TV media programs, which may include, among other information, a parental control rating for the media program.

Gather and search rating program 300 scans text included in the video frames of a configurable period of time of the transmission media stream and an OCR component recognizes text images within the video stream and converts the text images to text data, which is associated with the current TV media program. The text data converted by the OCR component of gather and search rating program 300 includes the key terms associated with the TV media program. The key terms are used when a parental control rating is absent from a currently transmitted TV media program, and gather and search rating program 300 searches local database 240 to match key terms with a previous transmission of the same TV media program, which includes a parental control rating.

Local database 240 is a physical storage device connected to set-top box 210. Local database 240 receives and stores text data, including key terms and parental control ratings associated with a TV media program. Since only small amounts of text data are stored in local database 240 for TV media programs to which OCR techniques are applied, data for many TV media program may be included in local database 240.

Figure 3:
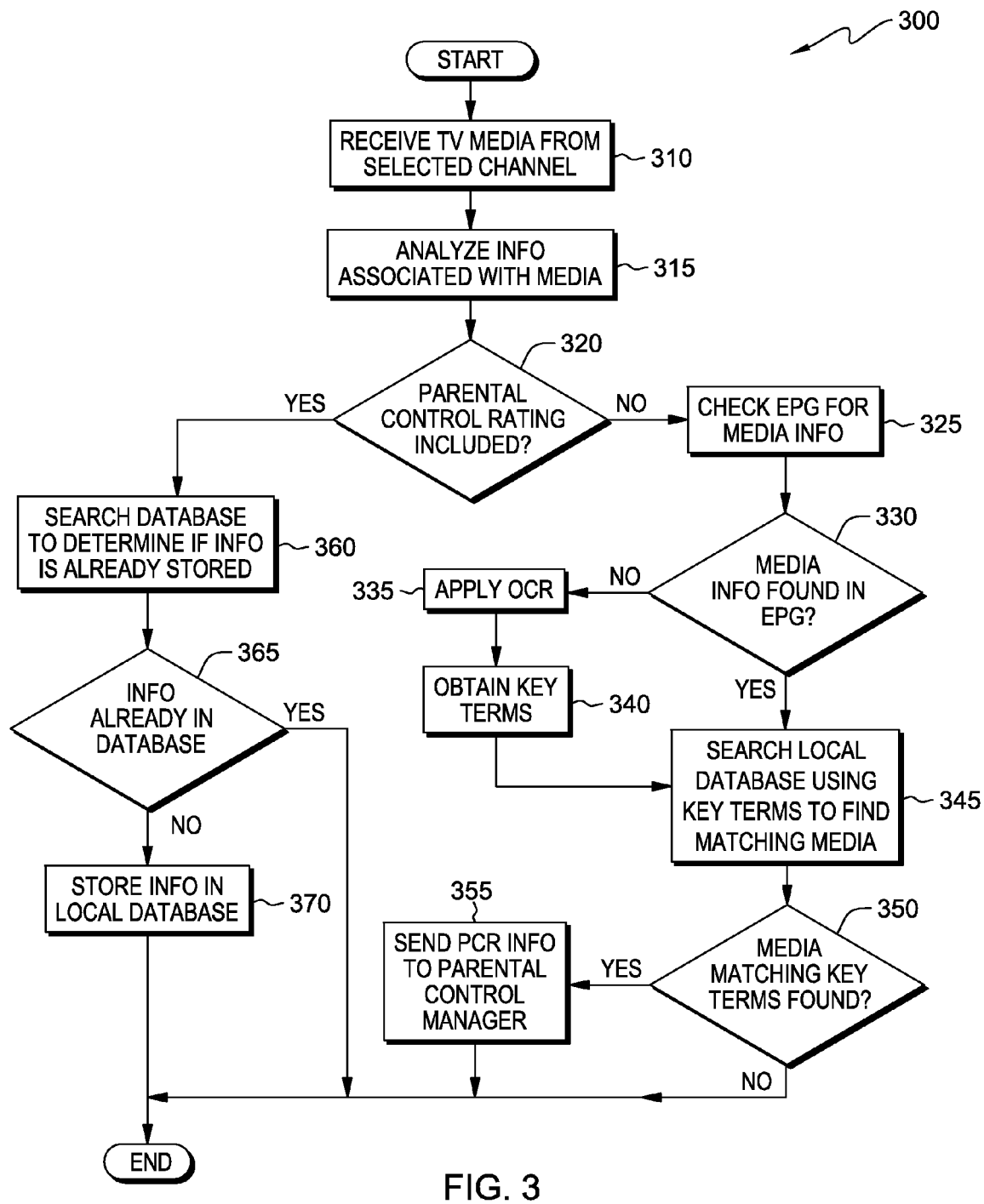
FIG. 3 is a flowchart illustrating the operational steps of a gather and search ratings program within the data processing environment of FIG. 1, in accordance with an embodiment of the present invention.

FIG. 3 is a flowchart illustrating the operational steps of gather and search rating program 300 for parental control information, in accordance with an embodiment of the present invention. Gather and search rating program 300 receives the TV media from a selected channel (step 310). A set-top box, such as set-top box 210 (FIG. 2), typically includes a TV-tuner from which a channel may be selected by user input. A channel is a transmission at a defined frequency with other channels having different frequencies. TV media programs are scheduled and transmitted on a specific channel. To view a program, a user selects a channel associated with the display of the program. Gather and search rating program 300 receives the TV media program associated with the channel selected by the user.

Gather and search rating program 300 analyzes the information associated with the TV media program (step 315). The TV media program may include information such as a program title, a description of the program, names of the director and the producer of the program, an episode if applicable, a date associated with the program, names of other contributors to the program, a duration of the program, a soundtrack title associated with the program, a production company name, a symbol, an image, and possibly other information. If available, the TV media program information is in an appropriate format for searching on one or more elements of the information. Typically the video stream of the TV media program includes the information within the VBI of video frames.

Gather and search rating program 300 analyzes the information, determining that information is available and the content of the information. In one embodiment of the present invention, gather and search rating program 300 uses keyword and translation technologies to associate analyzed information to determine the title associated with the TV media program, as well as names associated with the director, the producer(s) and information in a description that may apply to an episode of the program.

For example, gather and search rating program 300 receives a video stream from a TV media program and analyzes the content of the VBI of video frames. Recognizing keywords, for example, "director", "producer", and "title", as well as other keywords within the video stream, gather and search rating program 300 associates the text, for example, "John Smith" with the keyword "director". Similarly as an example, text such as "Jane Jones" is associated with the keyword "producer", and "The Year In Review" text is associated with the keyword "title". Gather and search rating program 300 uses keyword recognition to identify text corresponding to information that can be used to identify the TV media program. Gather and search rating program 300 may also use translation to identify terms such as "title", "director", and "producer" for TV media in non-English content.

Having confirmed that the TV media program includes information and having analyzed the information, gather and search rating program 300 determines if a parental control rating is included in the information (decision step 320). Parental control ratings are recognizable by gather and search rating program 300. In one embodiment the parental control rating information is in a text format, whereas in another embodiment, the parental control rating information is represented by an icon or graphical image. The text, icon and/or graphical image may be identified by use of a lookup table or reference file. Determining that a parent control rating is present (step 320, "YES" branch), gather and search rating program 300 searches the local database to determine if the information associated with the TV media program is already stored in the database (step 360). Gather and search rating program 300 uses the text information associated with keywords obtained by analyzing the video stream of the TV media program, to search the local database and determine if the information associated with the current TV media program is already stored in the local database.

For example, set-top box 210 (FIG. 2) receives a TV media program from transmission media 250. Gather and search rating program 300 analyzes the information included in the TV media program and determines that the information includes a parental control rating and further determines keyword search text, hereafter referred to as "key terms", for the title of the program to be "The Year In Review" and the director to be "John Smith" and the producer to be "Jane Jones". Gather and search rating program 300 uses the key terms to search local database 240 (FIG. 2).

Having searched the local database using the key terms, gather and search rating program 300 determines if the information is already in the local database (decision step 365). Determining that the text and parental control rating associated with the TV media program are already in the database (step 365, "YES" branch), gather and search rating program 300 takes no further action and ends for the current TV media program.

Having determined that the information is not already included in the database (step 365, "NO" branch), gather and search rating program 300 stores the information in the local database (step 370) and ends for the current TV media program. Gather and search rating program 300 determines that there is no match in the database for the key terms of the TV media program text information, and stores the information associated with the current TV media program, including the parental control rating, in the local database.

For example, gather and search rating program 300 searches local database 240 for the key terms of "The Best Show", "John Doe", and "Susan Carter", associated with the title, director name, and producer name, respectively, for the current TV media program. Gather and search rating program 300 fails to find a match of the key terms in local database 240, and responds by storing the information associated with the current TV media program, including a parental control rating of TV-PG, in local database 240, then ends for the current TV media program.

For the case in which the parental control rating is included in the TV media program video stream, gather and search rating program 300 does not need to send the parental control rating to the parental control manager. The parental control manager can determine the rating information directly from the TV media program signal stream and compare the rating to the previously set rating limit or threshold to determine if the TV media program is to be displayed on the TV.

Returning to decision step 320, if gather and search rating program 300 determines that the parental control rating is not included in the content of the TV media program (step 320, "NO" branch), gather and search rating program 300 checks the EPG to obtain information associated with the TV media program (step 325). The EPG may contain characteristic information associated with the TV media program. Gather and search rating program 300 checks the content of the EPG to determine if information associated with the TV media program is found, and finding information associated with the TV media program in the EPG (step 330, "YES" branch), gather and search rating program 300 uses the information obtained from the EPG to search the local database using key terms to find matching media (step 345). The EPG information may include metadata or identifying elements associated with the current TV media program that may include the program title, director name, producer name, or other role or description information, associated with the current TV media program, which can be used by itself or in combination, to identify the TV media program in a search of the local database.

For example, the EPG may include the key terms of the title "The Year In Review", the director's name of "John Smith" and the producer's name of "Jane Jones", which are associated with the current TV media program. Gather and search rating program 300 uses the key terms to search the local database to determine if there is a match with information from a previously viewed program which includes the parental control rating.

Gather and search rating program 300 determines if the information matching the TV media program was found (decision step 350). The key terms obtained from the EPG information are searched in the local database connected to the set-top box, such as local database 240 connected to set-top box 210.

Having found matching key terms in the local database, information from within the local database, gather and search rating program 300 sends the parental control rating (PCR) information to the parental control manager (step 355), and ends. The parental control manager, such as parental control manager 230, receives the parental control rating information retrieved from a key term match of a TV media program previously viewed. The parental control manager compares the PCR to a pre-set parental control rating limit for the TV and if the rating exceeds the pre-set limit, the current TV media program is blocked.

Returning to decision step 330, if gather and search rating program 300 determines that the TV media program information is not found in the EPG (step 330, "NO" branch), gather and search rating program 300 applies optical character recognition (OCR) techniques to the video stream of the current TV media program (step 335). Gather and search rating program 300 analyzes the video stream of the current TV media program for a configurable period of time, to determine text images within video frames. In one embodiment of the present invention, because the video stream of the current TV media program may include multiple frames per second, gather and search rating program 300 may use a sampling of frames from the video stream of the current TV media program to obtain text images to convert to searchable text data.

Having determined and converted text images from the frames of the video stream of the current TV media program, gather and search rating program 300 obtains key terms from the converted text images (step 340). As text images in the video stream are recognized and converted by OCR techniques, gather and search rating program 300 determines which converted text are associated with one or more identifying elements or metadata of the TV media program such as, for example, the title, the director, the producer, the episode if available, the duration of the program, the description of the program, and other text that may identify the current TV media program. Gather and search rating program 300 uses the text associated with the identifying elements or metatdata as key terms, to be used for searching and identifying the current TV media program.

For example, gather and search rating program 300 initiates OCR of the video stream of the current TV media program, while the transmission video stream is received or "on-the-fly". The OCR component of gather and search rating program 300 "recognizes" text images within the video stream of the current TV media program, which is being viewed. Gather and search rating program 300 converts the text images to text data that can be searched, and identifies the text data associated with identifying elements of the current TV media program, such as the title, the director, the producer, the description, etc. Gather and search rating program 300 uses the text data associated with the identifying elements of the current TV media program as key terms to use for searching.

Having obtained the key terms, gather and search rating program 300 searches the local database using the key terms to find matching media (step 345). The key terms are used to search the local database to possibly match identifying elements of the current TV media program with a previous transmission of the same TV media program that includes the parental control rating, and was stored on the local database. For example, if the current TV media program is determined by OCR to include the text data of "The Best Show" as a title, a director name of "John Doe", and a producer name of "Susan Carter", gather and search rating program 300 uses the text data as key terms with which to search local database 240, to find a media program with matching terms.

Gather and search rating program 300 completes a search of the local database and determines if media matching the key terms is found (decision step 350), and determining that media matching the key terms used to search the local database has not been found (step 350, "NO" branch), gather and search rating program 300 ends, for the current TV media program. In one embodiment of the present invention, the parent control manager may have a default setting as to whether to block or display the TV media program if no parental control rating information can be determined.

If gather and search rating program 300 determines that media matching the key terms used to search the local database has been found (step 350, "YES" branch), gather and search rating program 300 retrieves the parental control rating from the information associated with the matching TV media program on the local database, and sends the parental control rating information to the parental control manager (step 355). After sending the retrieved parental control rating information to the parental control manager, gather and search rating program 300 ends.

For example, OCR techniques applied to the current TV media program convert text images found in the video stream and gather and search rating program 300 determines that the title of the current TV media program is "The Best Show" and the name of the director is "John Doe", and the name of the producer is "Susan Carter". Gather and search rating program 300 searches local database 240 and finds a match with a previously viewed TV media program. Gather and search rating program 300 retrieves the parental control rating of TV-14 from the previously viewed TV media program information stored on local database 240 connected to set-top box 210, and sends the parental control rating information to parental control manager 230. Parental control manager 230 compares the parental control rating information received from gather and search rating program 300 and determines whether to block the current TV media program or allow the program to display.

In another embodiment of the present invention, gather and search rating program 300 can scan the EPG transmission each day for the daily media programs scheduled to be transmitted. Gather and search rating program 300 can determine if a media rating, such as a parental control rating, is included along with additional media information as discussed above (e.g., title, director name, producer name, etc.), for each media program scheduled for the day. Gather and search rating program 300 determines if the information and rating for scheduled media programs is already stored in local database 240, and stores the information and rating associated with the one or more media programs, if not already stored on local database 240. In this manner, the base of information associated with media programs, used to search for media ratings (parental control ratings), can be grown efficiently.

Figure 4:
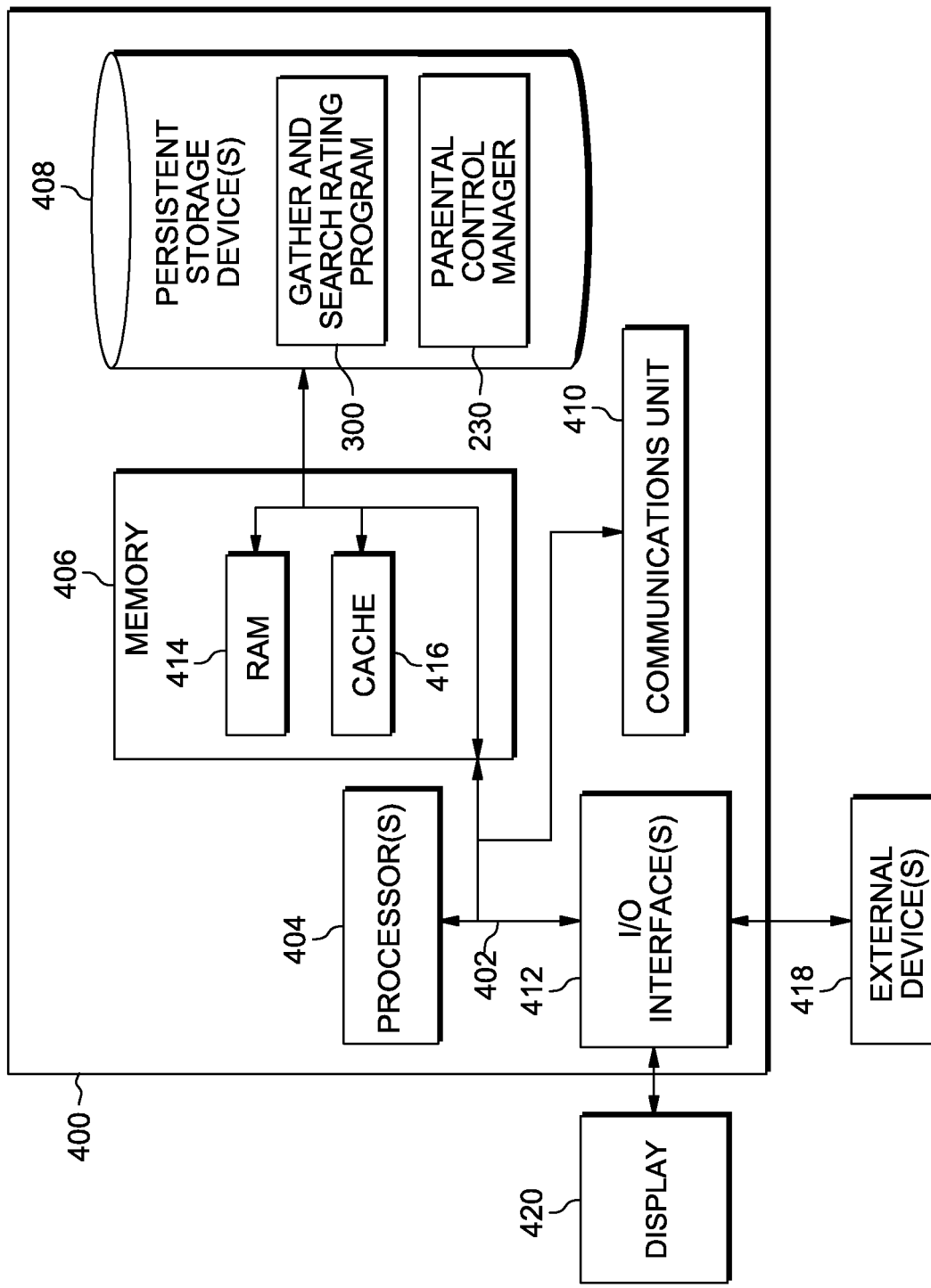
FIG. 4 depicts a block diagram of components of a parental control system, including a gather and search rating program, in accordance with an embodiment of the present invention.

FIG. 4 depicts a block diagram of components of parental control system 400, including gather and search rating program 300, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Parental control system 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Parental control manager 230 and gather and search rating program 300 are stored in persistent storage 408 for execution by one or more of the respective computer processor(s) 404 via one or more memories of memory 406. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of parental control system 400. In these examples, communications unit 410 includes one or more network interface cards. Communications unit 410 may provide communications through the use of either or both physical and wireless communications links. Parental control manager 230 and gather and search rating program 300 may be downloaded to persistent storage 408 through communications unit 410.

I/O interface(s) 412 allows for input and output of data with other devices that may be connected to parental control system 400. For example, I/O interface(s) 412 may provide a connection to external device(s) 418 such as a keyboard, a keypad, a touch screen, and/or some other suitable input device. External device(s) 418 can also include portable computer-readable storage media such as, for example, thumb drives, portable optical or magnetic disks, and memory cards. Software and data used to practice embodiments of the present invention, e.g., parental control manager 230 and gather and search rating program 300, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for determining a media rating, the computer program product comprising:
    one or more computer-readable storage medium(s) and program instructions stored on the one or more computer-readable storage medium(s), the program instructions comprising:
one or more computer-readable storage medium(s) and program instructions stored on the one or more computer-readable storage medium(s), the program instructions comprising:
    computer-readable program code configured to store a plurality of media programs that are previously viewed, each media program of the plurality of media programs including a set of metadata, which includes a media rating associated with each media program of the plurality of media programs, respectively, and wherein the plurality of the media programs that are previously viewed, are stored in a local repository;
    computer-readable program code configured to receive a first media program and a first set of metadata associated with the first media program that is at least absent a media rating;
    computer-readable program code configured to determine the first set of metadata associated with the first media program that is at least absent the media rating, wherein the first set of metadata associated with the first media program is searchable content;
    in response to determining that the first set of metadata associated with the first media program lacks sufficient metadata to identify the first media program by searching the metadata associated with the plurality of media programs that are previously viewed and are stored in the local repository, computer-readable program code configured to perform an optical character recognition scan of an entire image content within a sampling of frames of a pre-determined duration of the first media program, wherein characters recognized from the entire image content are transformed to searchable content;
    computer-readable program code configured to search the local repository based on the searchable content of the first set of metadata associated with the first media program that is at least absent the media rating; and
    in response to determining a match of the searchable content of the first set of metadata associated with the first media program that is at least absent the media rating to a second set of metadata associated with a second media program of the plurality of media programs that are previously viewed and are stored in the local repository, and wherein the second set of metadata associated with the second media program includes a media rating, computer-readable program code configured to apply the media rating associated with the second media program of the plurality of media programs that are previously viewed, to the first media program that is at least absent the media rating.

2. The computer program product of claim 1, further comprising:
    computer-readable program code configured to search an electronic programming guide for metadata associated with the first media program that is at least absent the media rating.

3. The computer program product of claim 1, wherein the set of metadata associated with the first media program of the plurality of media programs includes at least one of: a title of the first media program, a subtitle of the first media program, a name of a director of the first media program, a name of a producer of the first media program, one or more names of an actor of the first media program, one or more names of an actress of the first media program, a description of the media program, a duration of the first media program, an episode of the first media program, a production date associated with the first media program, a soundtrack title associated with the first media program, a production company name of the first media program.

4. The computer program product of claim 1, wherein the first set of metadata associated with the second media program includes at least one of: a title of the second media program, a subtitle of the second media program, a name of a director of the second media program, a name of a producer of the second media program, one or more names of an actor of the second media program, one or more names of an actress of the second media program, a description of the second media program, a duration of the second media program, an episode of the second media program, a production date associated with the second media program, a soundtrack title associated with the second media program, a production company name of the second media program.

5. The computer program product of claim 1, further comprising:
    computer-readable program code configured to deliver the media rating for the first set of metadata associated with the first media program, based on the second set of metadata associated with the second media program to a managing device, wherein the managing device compares the media rating based on the second set of metadata associated with the second media program to a threshold media rating, to determine whether to block viewing of the first media program.

6. The computer program product of claim 1, wherein the set of metadata for each of the plurality of media programs that are previously viewed, are received from scanning content of an electronic programming guide transmission for media programs that are selected.

7. The computer program product of claim 1, wherein the media rating is a parental control rating of a media program.

8. The computer program product of claim 1, wherein the metadata of the first media program including the media rating is received from a source other than a transmission of the first media program.

9. The computer program product of claim 1, further comprising:
- computer-readable program code configured to determine the media rating of the first media program based on the media rating of the second set of metadata associated with the second media program of the plurality of media programs that are previously viewed and stored in the local repository; and
- in response to determining the media rating of the first media program is disapproved, by comparing the determined media rating of the first media program to a pre-determined setting of approved media ratings, computer-readable program code configured to block viewing of the first media program.

10. A computer system for determining a media rating, the computer system comprising:
- one or more computer processors;
- one or more computer-readable storage medium(s);
- program instructions stored on one of the one or more computer-readable storage medium(s) for execution by at least one of the one or more processors, the program instructions comprising:
  - program instructions to store a plurality of media programs that are previously viewed, each media program of the plurality of media programs including a set of metadata, which includes a media rating associated with each media program of the plurality of media programs, respectively, and wherein the plurality of the media programs that are previously viewed, are stored in a local repository;
  - program instructions to receive a first media program and a first set of metadata associated with the first media program that is at least absent a media rating;
  - program instructions to determine the first set of metadata associated with the first media program that is at least absent the media rating, wherein the first set of metadata associated with the first media program is searchable content;
  - in response to determining that the first set of metadata associated with the first media program lacks sufficient metadata to identify the first media program by searching the metadata associated with the plurality of media programs that are previously viewed and are stored in the local repository, computer-readable program code configured to perform an optical character recognition scan of an entire image content within a sampling of frames of a pre-determined duration of the first media program, wherein characters recognized from the entire image content are transformed to searchable content;
  - program instructions to search the local repository based on the searchable content of the first set of metadata associated with the first media program that is at least absent the media rating; and
  - in response to determining a match of the searchable content of the first set of metadata associated with the first media program that is at least absent the media rating to a second set of metadata associated with a second media program of the plurality of media programs that are previously viewed and are stored in the local repository, and wherein the second set of metadata associated with the second media program includes a media rating, program instructions to apply the media rating associated with the second media program of the plurality of media programs that are previously viewed, to the first media program that is at least absent the media rating.

* * * * *